(12) United States Patent
Wright et al.

(10) Patent No.: US 7,846,237 B2
(45) Date of Patent: Dec. 7, 2010

(54) CYCLICAL SWING ADSORPTION PROCESSES

(75) Inventors: Andrew David Wright, Guildford (GB); Mohammad Ali Kalbassi, Weybridge (GB); Timothy Christopher Golden, Allentown, PA (US); Christopher James Raiswell, Crewe (GB)

(73) Assignee: Air Products and Chemicals, Inc., Allentown, PA (US)

( * ) Notice: Subject to any disclaimer, the term of this patent is extended or adjusted under 35 U.S.C. 154(b) by 355 days.

(21) Appl. No.: 12/106,659

(22) Filed: Apr. 21, 2008

(65) Prior Publication Data

US 2009/0260518 A1 Oct. 22, 2009

(51) Int. Cl.
*B01D 53/047* (2006.01)
(52) U.S. Cl. .................. 95/11; 95/96; 95/97; 95/139; 95/148; 96/11; 96/130
(58) Field of Classification Search .............. 95/96, 95/97, 8, 11, 139, 148; 96/111, 130
See application file for complete search history.

(56) References Cited

U.S. PATENT DOCUMENTS

| | | | |
|---|---|---|---|
| 3,808,773 A | 5/1974 | Reyhing et al. | |
| 4,197,095 A | 4/1980 | White, Jr. et al. | |
| 4,247,311 A | 1/1981 | Seibert et al. | |
| 4,472,178 A | 9/1984 | Kumar et al. | |
| 4,605,425 A | 8/1986 | Verrando et al. | |
| 4,693,730 A | 9/1987 | Miller et al. | |
| 4,732,577 A * | 3/1988 | Koizumi et al. | 95/101 |
| 4,816,043 A | 3/1989 | Harrison | |
| 4,971,610 A | 11/1990 | Henderson | |
| 5,123,277 A | 6/1992 | Gray et al. | |
| 5,199,964 A | 4/1993 | Graff | |
| 5,215,555 A | 6/1993 | Graff | |
| 5,405,431 A | 4/1995 | Eastman | |
| 5,529,607 A | 6/1996 | Tan | |
| 5,846,295 A | 12/1998 | Kalbassi et al. | |
| 5,853,455 A | 12/1998 | Gibson | |
| 5,885,650 A | 3/1999 | Melody et al. | |
| 5,989,313 A | 11/1999 | Mize | |
| 6,077,331 A | 6/2000 | Phillips | |
| 6,200,365 B1 | 3/2001 | Eimer et al. | |
| 6,383,256 B1 | 5/2002 | Phillips | |
| 6,402,809 B1 | 6/2002 | Monereau et al. | |
| 6,599,347 B2 | 7/2003 | Kalbassi et al. | |
| 2004/0055462 A1 | 3/2004 | Monereau | |

FOREIGN PATENT DOCUMENTS

| | | |
|---|---|---|
| EP | 0 123 061 A1 | 10/1984 |
| EP | 0 815 920 A | 1/1998 |
| EP | 0925821 | 6/1999 |
| EP | 1 226 860 A | 7/2002 |
| SU | 929178 | 5/1982 |

* cited by examiner

*Primary Examiner*—Robert A Hopkins
(74) *Attorney, Agent, or Firm*—Willard Jones, II

(57) ABSTRACT

The concentration of adsorbate in the feed gas to an on-stream bed of a cyclical swing adsorption process is monitored and the data processed to predict the time required to complete the on-stream mode of that bed and the purge flow rate and/or other regeneration mode operating condition of the concurrently off-stream bed is modified in response to changes in said predicted time whereby the regeneration mode of the off-steam bed is completed at the same time as the on-stream mode of the concurrent on-stream bed.

21 Claims, 3 Drawing Sheets

CYCLICAL SWING ADSORPTION PROCESSES

BACKGROUND OF THE INVENTION

This invention relates to cyclical swing adsorption processes for the separation of a feed gas mixture. As used in this specification, the term "separation" includes the removal of contaminants and/or impurities from a gas stream that may subsequently be further separated. The invention has particular, but not exclusive, application to removing, or at least reducing the level of, carbon dioxide in a feed gas to render it suitable for downstream processing. The invention is especially useful in removing carbon dioxide from air which is to be employed as a feed gas in a process for the cryogenic separation or purification of air.

Carbon dioxide is a relatively high boiling gaseous material and removal of this and other high boiling materials, for example water, which may be present in a feed gas is necessary where the mixture is to be subsequently treated in a low temperature, for example cryogenic, process. If relatively high boiling materials are not removed, they may liquefy or solidify in subsequent processing and lead to pressure drops and flow difficulties in the downstream process. It may also be necessary or desirable to remove hazardous, for instance explosive, materials prior to further processing of the feed gas so as to reduce the risk of build-up in the subsequent process thereby presenting an explosion hazard. Hydrocarbon gases, for example acetylene, may present such a hazard.

Several processes are known for separating one or more components from a feed gas mixture using selective adsorption by a solid adsorbent. These processes include temperature swing adsorption (TSA), pressure swing adsorption (PSA), thermal pressure swing adsorption (TPSA) and thermally enhanced pressure swing adsorption (TEPSA). Usually, the process is conducted in a cyclical manner in which one adsorber bed is in an on-stream mode, during which adsorbate is adsorbed from a feed gas mixture passing through the bed, while another adsorber bed is in a regeneration mode, during which the adsorbed adsorbate is desorbed from the bed, and said beds alternate between said modes, Generally, in these processes having air as the feed gas, water and carbon dioxide are removed from an air feed gas by contacting the mixture with one or more adsorbents which adsorb water and carbon dioxide. The water adsorbent material typically is silica gel, alumina or a molecular sieve and the carbon dioxide adsorbent material typically is a molecular sieve, for example, a zeolite. It is conventional to remove water first and then carbon dioxide by passing the feed air through a single adsorbent layer or separate layers of adsorbent selected for preferential adsorption of water and carbon dioxide in a column. Removal of carbon dioxide and other high boiling components to a very low level is especially desirable for the efficient operation of downstream processes.

After adsorption, the flow of feed gas is shut off from the adsorbent bed and the adsorbent is exposed to a flow of regeneration gas which strips the adsorbed materials, for example carbon dioxide and water, from the adsorbent and so regenerates it for further use.

In a TSA process for carbon dioxide and water removal, atmospheric air is typically compressed using a main air compressor (MAC) followed by water-cooling and removal of the thus condensed water in a separator. The air may be further cooled using, for example, refrigerated ethylene glycol. The bulk of the water is removed in this step by condensation and separation of the condensate. The gas is then passed to an adsorber bed system where the remaining water and carbon dioxide are removed by adsorption.

By using two adsorbent beds in a parallel arrangement, one may be operated for adsorption while the other is being regenerated and their roles periodically reversed in the operating cycle. Conventionally equal periods are devoted to adsorption and to regeneration.

As the component which is being removed from the feed gas is adsorbed while the bed is on-stream, the adsorption process will generate heat of adsorption causing a heat pulse to progress downstream through the adsorbent. The heat pulse is allowed to proceed out of the downstream end of the adsorbent bed during the feed or on-stream period. During the regeneration process, heat must be supplied to desorb the gas component which has been adsorbed on the bed. In the regeneration step, part of the product gas, for instance nitrogen or a waste stream from a downstream process, is used to desorb the adsorbed components and may be compressed in addition to being heated. The hot gas is passed through the bed being regenerated so removing the adsorbate. Regeneration conventionally is carried out in a direction counter to that of the adsorption step.

In a PSA system, cycle times are usually shorter than in a TSA system, but feed temperature and pressure and the regeneration gas often are similar. However in PSA systems, the pressure of the regeneration gas is lower than that of the feed gas and the change in pressure is used to remove the carbon dioxide and water from the adsorbent. Regeneration is suitably commenced before the heat pulse mentioned above in relation to TSA has reached the downstream end of the bed. The direction of the heat pulse is reversed by the process of regeneration and the heat which derived from the adsorption of the gas component in question is retained in the bed and used for desorbing that component during regeneration. In contrast to TSA, it is unnecessary to heat the regeneration gas.

Thermal pressure swing adsorption (TPSA) is also suitable for removing carbon dioxide and water from feed air. In a TPSA system, water is typically confined to a zone in which a water adsorption medium, for example activated alumina or silica gel, is disposed. A separate layer comprising, for example, a molecular sieve for the adsorption of carbon dioxide is typically employed and the molecular sieve layer and the zone for adsorption of water conventionally are separate. In contrast to a TSA system, water does not enter the molecular sieve layer to any significant extent which advantageously avoids the need to input a large amount of energy in order to desorb the water from the molecular sieve layer. TPSA processes are described in, for example, U.S. Pat. Nos. 5,885,650 and 5,846,295, the contents of which are incorporated herein by this reference.

Thermally enhanced PSA (TEPSA), like TPSA, utilizes a two stage regeneration process in which carbon dioxide previously adsorbed is desorbed by TSA and adsorbed water is desorbed by PSA. In this process, desorption occurs by feeding a regeneration gas at a pressure lower than the feed stream and a temperature greater than the feed stream and subsequently replacing the hot regeneration gas by a cold regeneration gas. The heated regenerating gas allows the cycle time to be extended as compared to that of a PSA system so reducing switch losses as heat generated by adsorption within the bed may be replaced in part by the heat from the hot regeneration gas. A TEPSA process is described in, for example, U.S. Pat. No. 5,614,000, the content of which is incorporated herein by this reference.

In contrast to PSA, TSA, TEPSA and TPSA all require the input of thermal energy by means of heating the regeneration gas but each procedure has its own characteristic advantages and disadvantages. The temperatures needed for the regenerating gas are typically sufficiently high, for example 50° C. to 200° C., as to place demands on the system engineering which increases costs. Typically, there will be more than one adsorbate which is removed in the process and generally one or more of these components, for example water, will adsorb strongly and another, for example carbon dioxide, much more weakly. The high temperature used for regenerating needs to be sufficient for the desorption of the more strongly adsorbed component. The high temperature employed in a TSA, TPSA and TEPSA systems may require the use of insulated vessels, a regeneration gas preheater and an inlet end precooler, and generally the high temperatures impose a more stringent and costly mechanical specification for the system. In operation, there is extra energy cost associated with using the purge preheater. The PSA system avoids many of these disadvantages by avoiding the need for coping with high temperatures, although the short cycle time which characterizes PSA brings its own disadvantages.

The design of a swing adsorption system takes account of potential variations in the composition of the feed gas mixture to be separated and conventionally is based on the worst possible feed conditions to accommodate all of the potential variations. Usually, the process conditions for the system are pre-selected and remain constant during operation in order to ensure that the feed gas having the highest likely content of adsorbate may be processed without risk of exceeding the capacity of the system to remove the adsorbate and so avoiding unacceptable levels of adsorbate being passed to a downstream process. In the case of removal of carbon dioxide and water from air, account is taken of the ambient prevailing conditions in the locality in which the process is to be operated as the level of carbon dioxide changes according to pollution levels and water in the feed gas changes according to variations in local temperature and relative humidity. In the particular case of carbon dioxide pollution, the carbon dioxide content of feed air can change rapidly and substantially in response to a change in wind direction if there is a burner stack emitting carbon dioxide in the vicinity or to a change in local weather conditions. For example, FIG. 1 is a chart showing the variation in ambient carbon dioxide concentration at an Air Products' air separation unit at Wigan, UK during the period 20th to 23rd Nov. 2005. There was foggy weather on 20th to 22nd Nov. 2005 during which the carbon dioxide concentration was above the normal level of about 450 ppm and reached a peak of about 680 ppm. Similarly, FIG. 2 is a chart showing the variation in ambient carbon dioxide concentration at an Air Products' air separation unit at Isle of Grain, UK during the period 4th to 8th Sep. 2006. There is a LNG burner stack in the vicinity of the unit and the effect of carbon dioxide emitted by that stack on the air separation unit is dependent upon the wind direction. As can be seen, carbon dioxide concentration peaked to over 10000 ppm.

There have been proposals in the prior art to vary the cycle time of a cyclical swing adsorption process to accommodate changes in feed gas composition. For example, U.S. Pat. No. 3,808,773 discloses the adsorptive purification of a gas containing water and one or more secondary components by passing the gas through a molecular sieve bed to remove adsorbable components, terminating the gas flow prior to the breakthrough of adsorbate water vapor therefrom, preferably upon the breakthrough of the least easily adsorbable secondary component, and then regenerating the molecular sieve at a relatively low temperature of 100-200° C. by passing a heated purge gas through the molecular sieve in the opposite direction to the gas flow. A dual bed system is described in which adsorption is conducted in one bed whilst the other undergoes regeneration for a set time period.

U.S. Pat. No. 4,197,095 discloses the adsorption of component(s) from a gas feed using a dual bed adsorption process in which operating conditions including the flow rate, inlet and outlet temperatures, inlet and outlet pressures and regenerating pressures are sensed; the quantity of purge flow required to regenerate the bed calculated; the purge flow rate under the operating conditions calculated; and the regeneration time controlled so that the purge flow stops when the bed has been regenerated. The cycling time is controlled at a period not shorter than the regeneration time and the beds switch at the end of that time.

U.S. Pat. No. 4,472,178 discloses the adsorption of carbon dioxide from a water-depleted gas feed stream gas stream by a TSA sequence in which the carbon dioxide-depleted gas product of an adsorption bed is initially passed through a recuperator to retain heat but, after the gas reaches a predetermined lower temperature, bypasses the recuperator. The flow of feed gas is discontinued when the gas product reaches a predetermined carbon dioxide concentration, the pressure of the bed is reduced and the bed initially purged countercurrently with a purge gas, which has been heated by externally supplied heat and recovered heat from the recuperator, until a thermal zone exists in the bed. The purge is continued without externally supplied heat until the thermal zone is approximately at the feed end of the bed and then discontinued, the bed is repressurized countercurrently with water and carbon dioxide-depleted gas until the bed reaches a preset pressure such that the adsorption cycle can be initiated again. A dual bed system is described in which adsorption is conducted in one bed whilst the other undergoes regeneration for a set time period.

U.S. Pat. No. 4,693,730 discloses a pressure swing adsorption process in which a characteristic of the effluent from cocurrent depressurization is sensed and corrective action responsive thereto taken to control product purity. The action can be adjustment of the amount of purging gas received by an adsorbent bed to control the extent of regeneration. In the exemplified embodiment, the sensed characteristic is impurity concentration and cycle times and impurity level target values are adjusted and the effluent characteristic of the depressurization of one bed results in corrective action affecting all beds.

U.S. Pat. No. 5,989,313 discloses PSA prepurification of air in which the cycle time for each of at least two adsorbers is controlled by a "real time" method in which actual totalized flow to an on-stream adsorber is accumulated, based upon measured flow values over a predetermined time period, and air feed conditions, for example, temperature, pressure, relative humidity, are monitored. Periodically, a maximum totalized flow to the adsorber is calculated based upon the monitored air feed conditions, the actual totalized flow value compared to the current calculated maximum totalized flow value and, when a predetermined relationship therebetween is reached, the on-stream adsorber is decoupled from the air feed and another adsorber is coupled thereto. The control of cycle times for each adsorber also takes into consideration: variations in load demand, purge to air feed ratio and upsets which occur on switching of adsorber beds. The purge to air feed ratio can be controlled, based on air flow and column recovery, and also if the bed temperature is high, such as in summer, the purge flow can be reduced.

U.S. Pat. No. 6,277,174 discloses a PSA process in which the maximum feed pressure to each of at least two beds is monitored during adsorption and the minimum evacuation pressure from each said bed is monitored during desorption, and individual step times are altered within a cycle, in accordance with the monitored pressures, to control flows to and between the beds to maintain a nearly constant pressure ratio. Purge and overlap equalization step times can be adjusted in accordance with the monitored pressures.

U.S. Pat. No. 6,402,809 discloses the purification of a gas, such as air, containing carbon dioxide and/or water by a TSA process in which at least one energy parameter, chosen from the flow rate of the regeneration gas entering and/or leaving an adsorber, the duration of the regeneration step and the regeneration temperature of the regeneration gas entering the adsorber, is controlled, modified and/or regulated depending on at least one operating condition chosen from the pressure of the gas to be purified entering and/or leaving the adsorber, the flow rate of the gas to be purified entering and/or leaving the adsorber, the temperature of the gas to be purified entering the adsorber and the content of impurities contained in the gas to be purified entering the adsorber and depending on the thermal profile of the heat front output by the adsorber at the end of regeneration. Preferably adsorption is conducted in one bed whilst another bed undergoes regeneration.

U.S. Pat. No. 6,599,347 discloses the adsorption of water and carbon dioxide from a feed gas using a thermal swing adsorption process in which one or more parameters relating to the water content of the feed gas is determined directly or indirectly and the adsorbent is regenerated using conditions based on said parameter(s). The feed gas parameter(s) can be measured continuously or periodically such as hourly or daily and the purge gas flow and/or temperature modified in response to the measured data.

None of these prior art processes permit of automatic control of the swing adsorption whereby completion time for regeneration of an adsorber bed can be changed to match completion time for concurrent adsorption by the on-stream bed to be replaced on-stream with the regenerated bed. It is an object of the present invention to provide such control so that the system can be operated under optimal conditions for the normal concentration of adsorbate in the feed gas but the regenerated bed made available for use more quickly than normal to accommodate for a reduced on-stream time resultant from increased adsorbate concentration above the normal level. Compared with convention system design providing operation to accommodate the highest expected adsorbate concentrations, this would permit longer on-stream time for normal operation while permitting reduction in on-stream time to accommodate for higher than normal adsorbate concentrations, or sudden unexpected changes to adsorbate concentration without limitation by the time required to complete regeneration of the replacement bed.

BRIEF SUMMARY OF THE INVENTION

The present invention provides a cyclical swing adsorption process in which one adsorber bed is in an on-stream mode, during which adsorbate is adsorbed from a feed gas mixture passing through the bed, while another adsorber bed is in a regeneration mode, during which the adsorbed adsorbate is desorbed from the bed, and said beds alternate between said modes, wherein the time required to complete the on-stream mode is determined by the total amount of the adsorbate in the feed gas mixture fed to the bed during said mode, the concentration of the adsorbate in the feed gas mixture is monitored during said on-stream mode and the time required to complete the on-stream mode predicted from said monitored concentration, and at least one regeneration mode operating condition is modified in response to changes in said predicted time whereby the regeneration mode is completed at the same time as the concurrent on-stream mode.

The invention also provides cyclical swing adsorption apparatus for conducting said process, said apparatus comprising:

at least two adsorber beds;

a control circuit for maintaining one bed in an on-stream mode for a time determined by total amount of adsorbate in the feed gas mixture fed to the bed during said mode, during which on-stream mode adsorbate can be adsorbed from a feed gas mixture passing through the bed, and another bed in a regeneration mode, during which the adsorbed adsorbate can be desorbed from the bed, and alternating said beds between said modes; and a total adsorber sensor for measuring the total amount of the adsorbate in the feed gas mixture fed to the bed during the on-stream mode, thereby determining the duration of the on-stream mode;

a concentration monitor for monitoring the concentration of the adsorbate in the feed gas mixture during said on-stream mode; and a processor for predicting, from said monitored concentration, the time required to complete the on-stream mode, said control circuit modifying at least one regeneration mode operating condition in response to changes in said predicted time whereby the regeneration mode is completed at the same time as the concurrent on-stream mode.

DETAILED DESCRIPTION OF THE INVENTION

Figure 1:
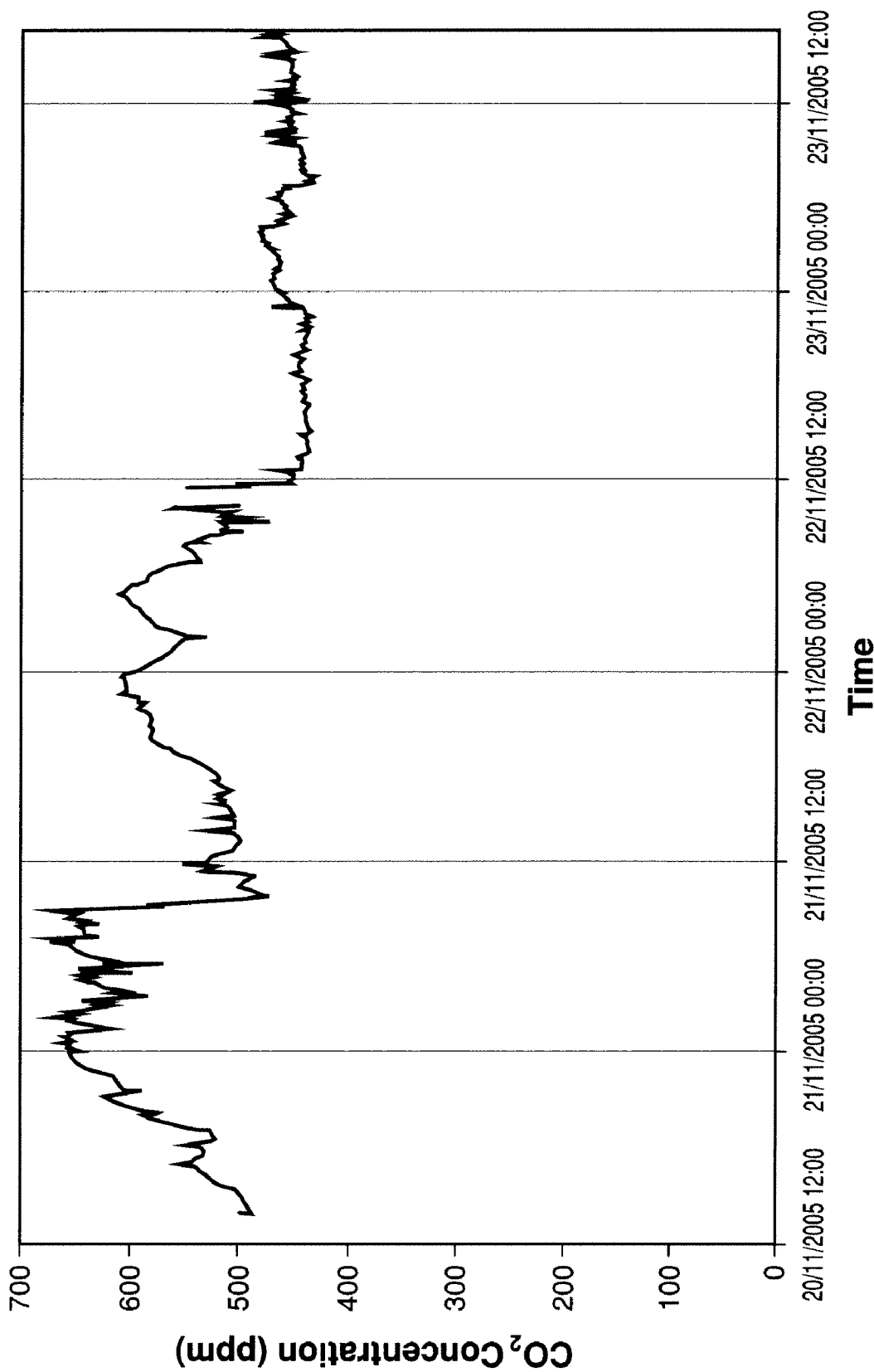
FIG. 1 is a chart showing the variation in ambient carbon dioxide concentration at an Air Products' air separation unit at Wigan, UK during the period 20th to 23rd Nov. 2005.
Figure 2:
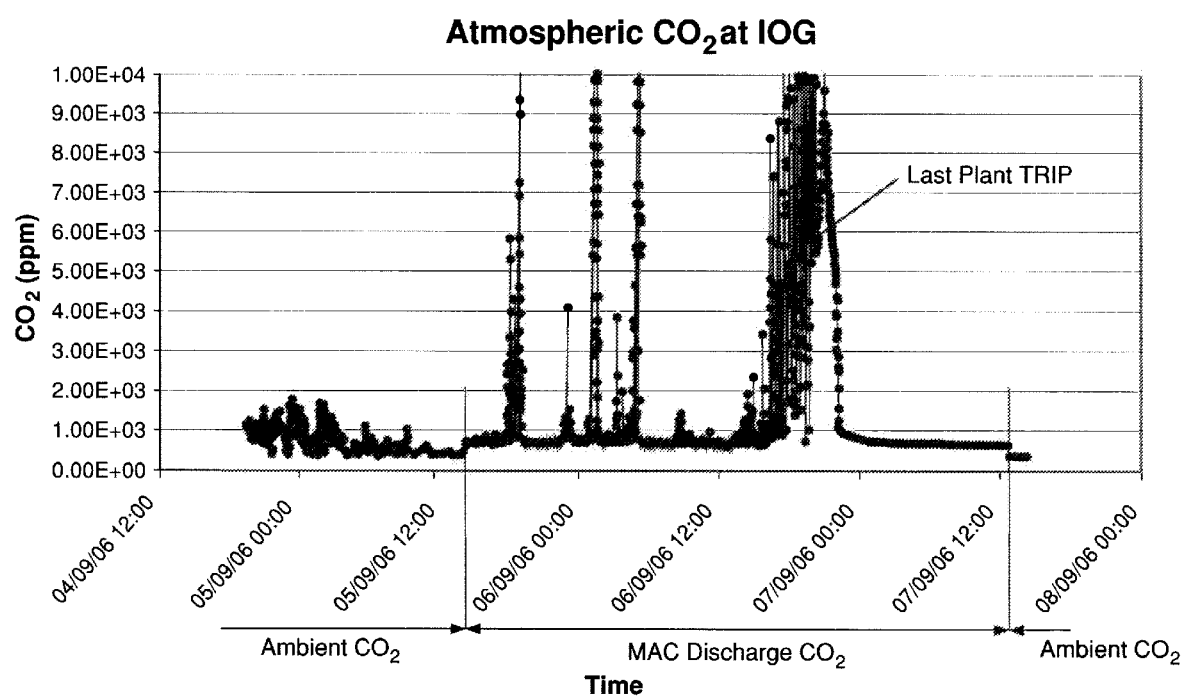
FIG. 2 is a chart showing the variation in ambient carbon dioxide concentration at an Air Products' air separation unit at Isle of Grain, UK during the period 4th to 8th Sep. 2006.

The present invention provides control of a swing adsorption system so that the system can be operated under optimal conditions for the normal concentration of adsorbate in the feed gas but the regenerated bed made available for use more quickly than normal to accommodate for a reduced on-stream time resultant from increased adsorbate concentration above the normal level. This is achieved by continuous or continual determination of adsorbate concentration of the feed gas, calculating from the resultant data an estimate of the on-stream time that will be achieved and automatically varying the purge flow or other operational parameter for the bed being regenerated so that it will have reached the required level of regeneration when the on-stream bed is saturated. Thus the purge flow rate used for normal operation can be reduced to match the normal on-stream time thereby reducing, compared with a conventional designed system, the amount of purge gas required and also the pressure drop through the bed on regeneration. This permits the minimum amount of purge gas is used at all times Accordingly to a first aspect of the present invention, there is provided a cyclical swing adsorption process in which one adsorber bed is in an on-stream mode, during which adsorbate is adsorbed from a feed gas mixture passing through the bed, while another adsorber bed is in a regeneration mode, during which the adsorbed adsorbate is desorbed from the bed, and said beds alternate between said modes, wherein the time required to complete the on-stream mode is determined by the total amount of the adsorbate in the feed gas mixture fed to the bed during said mode, the concentration of the adsorbate in the feed gas mixture is monitored during said on-stream mode and the time required to complete the on-stream mode predicted from said monitored concentration, and at least one regeneration mode operating condition is modified in response to changes in said predicted time whereby the regeneration mode is completed at the same time as the concurrent on-stream mode.

Except for the manner in which the on-stream and regeneration times are matched, the adsorption and regeneration modes can be operated in any conventional manner.

In a preferred embodiment, there is a minimum time for completion of the on-stream mode based on a datum concentration of the adsorbate in the feed gas mixture and the predicted time for completion changes only when the monitored concentration exceeds said datum concentration to the extent that the predicted time exceeds said minimum time. Usually, the datum concentration will be the highest concentration regularly expected in the feed gas under normal operation conditions. For example, in the case of adsorption of carbon dioxide from feed air in the UK, the datum concentration suitably is about 400 ppm.

The concentration of the adsorbate can be monitored by measurement in the feed gas mixture upstream of the on-stream adsorber bed and/or in the on-stream adsorber bed. It will be appreciated that there is more time available to make adjustments to the regeneration conditions when the measurement is made upstream of the adsorber bed but that the estimated on-line time will be less accurate than if the measurement is made in the bed. The closer the measurement is made to the bed outlet, the more accurate estimation of the on-stream time will be possible, but the ability to make this estimation can only begin after the adsorbate front has moved through the bed to the measuring position. As a result, there is a time lag before the regeneration conditions can be adjusted controller can start working, which means that the regeneration conditions may be sub-optimal. Measurements can be made at more than one location.

Suitably, the outlet concentration of adsorbate is measured in order to verify that the estimated on-stream time is correct and that adsorbates are not exiting the adsorbent bed. This measurement can be used to feed back to the on-stream time estimator software and make corrections to its predictions.

The at least one regeneration mode operating condition modified in response to the change in adsorbate concentration can be the flow rate of purge gas and/or the temperature of that gas and/or the regeneration heating time for TSA or shortening of the PSA cycle time to gain capacity.

Although the invention will be described below as applied to a TSA systems having two beds, it is of use also with other adsorption cycles, especially PSA, TEPSA & PSA systems) and for any pressures, temperatures, adsorbents and adsorbates. It can be applied to multiple beds with multiple feeds, products and regeneration flows. The adsorption beds may contain multiple adsorbent layers and the on-stream time can be controlled so that each adsorbate component in the feed gas can be retained within its own predefined section. In particular, in one embodiment of the invention, there are two or more adsorbates in the feed gas mixture, the time required to complete the on-stream mode is determined by the total amount of two or more of the adsorbates in the feed gas mixture fed to the bed during said mode, the concentrations of said adsorbates in the feed gas mixture determining the said on-stream time are monitored during said on-stream mode and the time required to complete the on-stream mode predicted from said monitored concentrations, and at least one regeneration mode operating condition is modified in response to changes in said predicted time whereby the regeneration mode is completed at the same time as the concurrent on-stream mode.

The invention has particular application to the removal of carbon dioxide from air or other carbon dioxide containing gas such as natural gas or synthetic gas (syngas) especially in a front-end prepurification unit for a cryogenic air separation unit providing at least an oxygen and/or nitrogen product stream.

When used to remove carbon dioxide from air, the air suitably is treated by contacting with an adsorbent in a first zone so as to remove water prior to removal of carbon dioxide in a second zone suitably on a second adsorbent. Suitable adsorbents include alumina, silica gel, activated alumina, impregnated alumina, and molecular sieves, for example type A and type X zeolites. The water adsorbent material preferably is silica gel, activated alumina, impregnated alumina or alumina and the carbon dioxide adsorbent material preferably is a molecular sieve for example, a zeolite. The zeolite may be bound or binderless and preferably is zeolite 13X, more preferably binderless zeolite 13X.

Preferably, the water adsorbent and carbon dioxide adsorbent are arranged in a composite bed with the carbon dioxide adsorbent downstream of the water adsorbent although separate beds may be employed if desired.

In a TSA process, the feed gas is suitably fed to the adsorption step at a temperature of −50 to 80° C. and preferably 0 to 60° C., especially 10 to 50° C. Suitably the pressure of the feed gas is at least 0.1 MPa, preferably 0.2 to 4 MPa, more preferably 0.2 to 3 MPa and desirably 0.2 to 1.5 MPa. Preferably, the regeneration gas comprises a gas recycled from a downstream process, for example a nitrogen-rich waste gas stream from an air separation unit which is dry and free of carbon dioxide. The regeneration of the adsorbent is carried out at a temperature above the bed adsorption temperature, suitably at a temperature of 50 to 400° C., preferably from 65 to 240° C. Suitably, the regeneration pressure is 0.01 to 3 MPa and preferably 0.03 to 1 MPa. It is especially desirable that the regeneration pressure does not exceed 50 percent of the pressure of the feed gas.

When removing carbon dioxide and water from feed air in an otherwise conventional swing adsorption treatment of feed air to an air separation unit, the preferred process parameters are as set forth in Table 1:

TABLE 1

|  | Preferred Range | Most preferred range |
|---|---|---|
| Feed Pressure (MPa) | 0.3 to 4 | 0.5 to 1.5 |
| Air Feed Temperature | 5 to 60 | 10 to 30 |
| Feed $CO_2$ (ppm) | 100 to 10000 | 300 to 1000 |
| Purge Pressure (MPa) | 0.03 to 3 | 0.01 to 1 |
| Cold Purge Temperature (° C.) | 5 to 80 | 10 to 40 |
| Hot Purge Temperature (° C.) (not applicable for PSA operation) | 50 to 300 | 65 to 240 |

According to a second aspect of the present invention, there is provided an air separation process in which air is compressed in a main air compressor to provide compressed air; carbon dioxide is removed from the compressed air by a cyclical swing adsorption process in which one adsorber bed is in an on-stream mode, during which carbon dioxide is adsorbed from the compressed air to provide a carbon dioxide-freed air feed, while another adsorber bed is in a regeneration mode, during which the carbon dioxide is desorbed from the bed, and said beds alternate between said modes; and the carbon dioxide-freed air feed is fed to an air separation unit to provide at least one product stream enriched in a component of the carbon dioxide-freed air feed, wherein the time required to complete the on-stream mode is determined by the total amount of the carbon dioxide in the compressed air, the concentration of the carbon dioxide in the compressed air is monitored during said on-stream mode and the time required to complete the on-stream mode predicted from said monitored concentration, and at least one regeneration mode operating condition is modified in response to changes in said predicted time whereby the regeneration mode is completed at the same time as the concurrent on-stream mode.

In so far as they are relevant to air separation, all of the alternatives and preferences discussed above in connection with the first aspect apply to the second aspect.

According to a third aspect of the present invention, there is provided cyclical swing adsorption apparatus for conducting a process of the first aspect, said apparatus comprising:

at least two adsorber beds;

a control circuit for maintaining one bed in an on-stream mode for a time determined by total amount of adsorbate in the feed gas mixture fed to the bed during said mode, during which on-stream mode adsorbate can be adsorbed from a feed gas mixture passing through the bed, and another bed in a regeneration mode, during which the adsorbed adsorbate can be desorbed from the bed, and alternating said beds between said modes; and a total adsorber sensor for measuring the total amount of the adsorbate in the feed gas mixture fed to the bed during the on-stream mode, thereby determining the duration of the on-stream mode;

a concentration monitor for monitoring the concentration of the adsorbate in the feed gas mixture during said on-stream mode; and a processor for predicting, from said monitored concentration, the time required to complete the on-stream mode, said control circuit modifying at least one regeneration mode operating condition in response to changes in said predicted time whereby the regeneration mode is completed at the same time as the concurrent on-stream mode.

Suitably, the total adsorber sensor is common with said concentration monitor.

In so far as they are relevant to apparatus structure, all of the alternatives and preferences discussed above in connection with the first aspect apply to the third aspect. For example, the concentration monitor can measure the concentration of the adsorbent in the feed gas mixture upstream of the on-stream adsorber bed and/or in the on-stream adsorber bed; the control circuit can control the flow rate and/or temperature of purge gas; and the apparatus preferably is a cyclical thermal swing adsorption apparatus.

According to a fourth aspect, the invention provides an air separation system for conducting a process according to the second aspect comprising:

a main air compressor to provide compressed air;

a cyclical swing adsorption apparatus in accordance with the third aspect to provide a carbon dioxide-freed air feed, and an air separation unit for separating said carbon dioxide-freed air feed to provide at least one product stream enriched in a component thereof.

Figure 3:
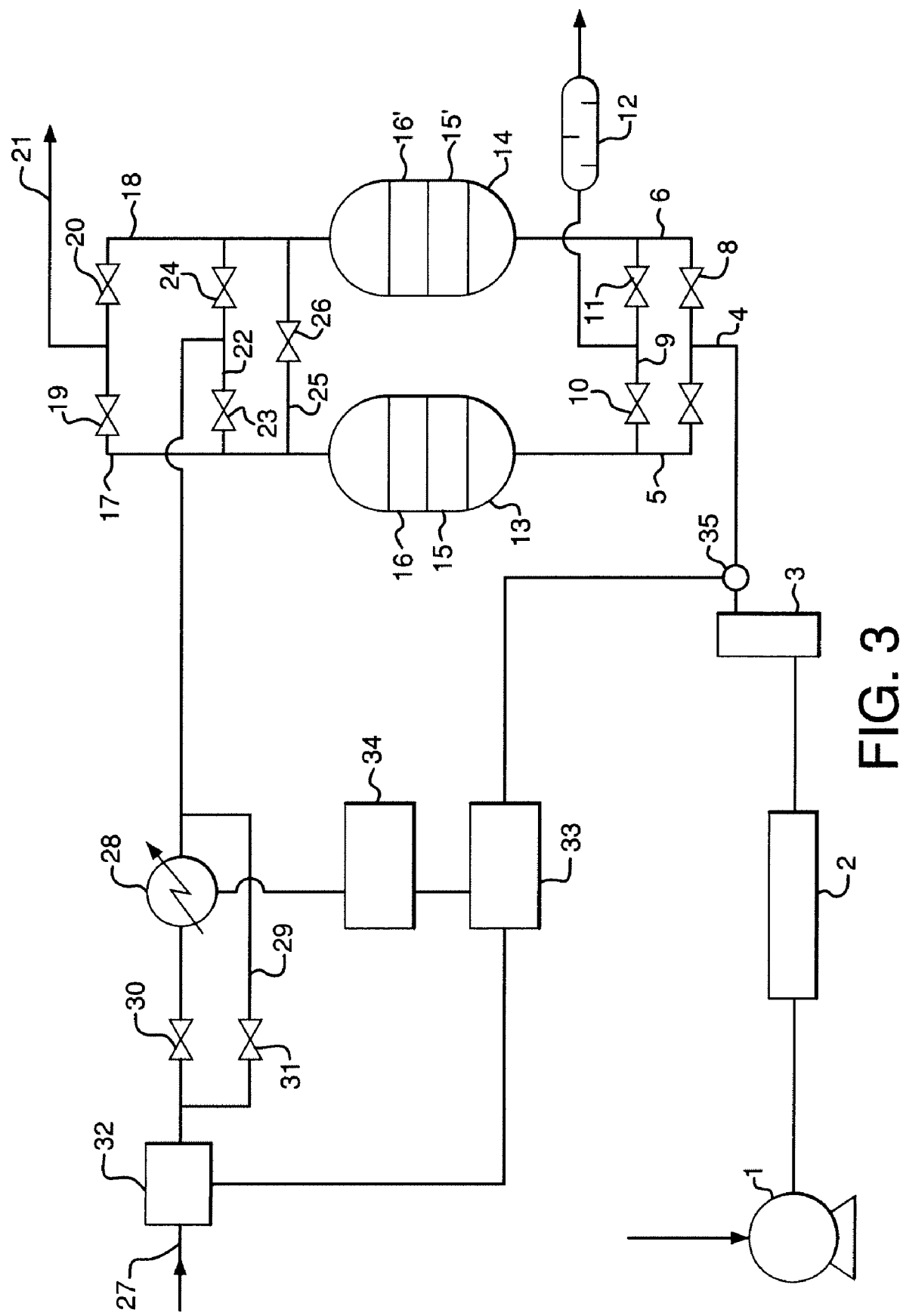
FIG. 3 is a schematically representation of a front-end prepurification unit for a cryogenic air separation unit using TSA operated in accordance with the present invention to remove carbon dioxide and water from the feed air to the unit.

Referring to FIG. 3, air to be purified is fed to a main air compressor (MAC) 1, in which it is compressed and then fed to a cooler 2 so as to condense at least some of the water vapor from the cooled compressed air. The compressed cooled air is fed to a separator 3, which acts to remove water droplets from the feed. The separator is connected to an inlet 4, in which the flow path divides into two paths 5, 6, having inlet control valves 7, 8 respectively. Downstream of the control valves 7, 8, the inlet paths 5, 6 are bridged by a vent 9, containing vent valves 10, 11. A silencer 12 is connected to the vent 9. Adsorption vessels 13, 14 are connected respectively to the inlet paths 5, 6 downstream of the vent 9. Each vessel 13, 14 contains an adsorbent bed containing two adsorbents 15, 16 and 15', 16' respectively. The upstream portion 15, 15' of the adsorbent beds contain an adsorbent for removing water, for example activated alumina or modified alumina and the downstream portion 16, 16' of the adsorption beds contains adsorbent for the removal of carbon dioxide, for example zeolite. Outlet paths 17, 18 are connected to each adsorption vessel 13, 14 and have outlet control valves 19, 20. The separate outlet paths 17, 18 join downstream of the control valves 19, 20 to provide a single outlet 21 which suitably is connected to downstream processing apparatus for example a cryogenic air separator (not shown). Upstream of the outlet control valves 19, 20 the outlet paths 17, 18 are bridged by a purge gas inlet 22, the bridge containing purge gas control valves 23, 24. A further bridging line 25 upstream from the purge gas inlet 22 also contains a control valve 26.

The purge gas inlet 22 is connected to purge gas feed 27 via a heater 28 or bypass line 29. Control valves 30, 31 are provided to control the flow and path of the purge gas. The purge gas suitably is obtained from the downstream processing apparatus fed by outlet 21.

A flow controller 32 is provided in the purge gas feed 27 to measure and control the flow of the purge gas to the inlet 22. The flow controller 32 receives a control signal from a processor 33, which provides also a control signal to a heat sequencer 34 for controlling the heating of the purge gas. A carbon dioxide sensor 35 located downstream of the separator 3 provides input to the processor 33 proportional to the carbon dioxide concentration in the cleaned air feed to the adsorber beds.

In use, air is compressed in the MAC 1 and then fed to the inlet 4 via the cooler 2 and separator 3 and passes through one ("on-stream" vessel) of the two adsorbent vessels 13, 14 in the downstream direction. The other adsorbent vessel ("off-stream" vessel) receives purge gas from inlet 22 which flows in the opposite direction to the flow of air in the first adsorption vessel.

With vessel 13 on-stream, air passes through open valve 7 to vessel 13 and through open valve 19 to the outlet 21 for downstream processing. Valve 8 is closed as adsorption vessel 14 is cut off from the air feed. Valves 20, 23, 24, 26, 10 and 11 are all closed. To commence regeneration of the bed in adsorption vessel 14, valve 11 is opened to depressurize the vessel 14 and valve 24 is opened to allow a flow of purge gas to pass through adsorption vessel 14. The purge gas typically will be a flow of dry, carbon dioxide-free nitrogen obtained from a downstream processing unit, for example the cold box of an air separation unit. The valve 30 is opened to allow purge gas to pass through the heater 28 and to be heated to, for example, a temperature of 100° C. or more prior to passing into vessel 14 at the required temperature. As the purge gas passes through the vessel 14 carbon dioxide is desorbed and a heat wave passes through the adsorbent bed 16'. At the appropriate time, for example as the heat wave passes into bed 15', valve 30 is closed and valve 31 is opened so the purge gas is not heated and passes into the vessel 14 and displaces the heat pulse further through the adsorbent 15'.

Whilst the adsorbent 16' is been regenerated by TSA, the cool purge gas, by virtue of its reduced pressure, desorbs water from the adsorbent 15' by PSA and, depending on whether the heat wave has passed into the adsorbent 15', also by TSA.

At the end of the regeneration period, valve 24 is closed and valve 26 is opened to displace purge gas from the bed in vessel 14. Valve 11 is then closed so as to repressurize vessel 14 with purified air. Valve 26 is then closed and valves 8 and 20 are opened whereby vessel 14 is placed on-stream. The vessel 13 may then be regenerated in a similar manner to the process described above, with the vessels 13, 14 being on-stream, depressurizing, regenerating, repressurizing and returning to on-stream operation in phased cycles of operation.

The processor 33 estimates from the carbon dioxide concentration data from sensor 35 the time required to complete the on-stream step. If the estimated on-stream time decreases, the processor controls the flow controller to increase the purge flow, and optionally the heater temperature and/or heater operational time, so that the heat pulse is pushed through the off-stream bed quicker and the bed cooled quicker so that it is fully regenerated in time to go back on-line. If the feed conditions change such that the estimated on-stream time increases, then the processor reduces the purge flow, and optionally the heater temperature and/or heater operational time, saving energy.

Without the control provided by the processor in response to the carbon dioxide concentration in the feed air, impurities can breakthrough the on-stream vessel at a time when the heat pulse is still within the bed of the off-steam vessel undergoing regeneration. As a result, the bed will be under-regenerated, added heat will have been wasted and it could have serious implications for the downstream equipment if it can not withstand the heat pulse that will be delivered. For example, an air separation unit usually has a feed temperature limit of about 65° C. Conventionally this scenario is avoided by oversizing the beds so that there is always sufficient time to cool the off-stream bed before the impurities breakthrough the on-stream bed. However, it is generally uneconomic to run the beds in this 'worst case scenario' mode for most of the year due to increased heater power and pressure drop. The present invention significantly improves efficiency by measuring adsorbate concentration in the feed gas entering the on-stream bed and processes the resultant information to control the purge flow to the off-stream bed.

EXAMPLES

The invention will be illustrated in more detail with reference to the following Examples, but it should be understood that the present invention is not deemed to be limited thereto.

Typical practice is to design beds for pre-purification of air feed to a cryogenic air separation unit using an assumed inlet concentration for carbon dioxide of about 400 ppm. However, as reported above, measurements taken during foggy periods or where the inlet to the main air compressor is close to a carbon dioxide source such as an LNG terminal, demonstrate that the concentration of carbon dioxide can increase rapidly and dramatically. Up to 10000 ppm has been recorded but 600 ppm is more typical. An adsorption system can be designed to cope with these conditions, but the purge gas flow required is much greater than for one in which only 400 ppm of carbon dioxide is present in the air. Accordingly, it is beneficial to run the adsorption system with a much longer on-stream time during most of the year when the feed concentration is 400 ppm and therefore operate with a lower purge gas flow, and only increase the flow when the carbon dioxide level rises. Examples below are given of the potential pressure drop saving (and thereby the compressor power)

Example 1

TPSA Cycle (as Described in U.S. Pat. No. 5,855,650)

|  | Design Case | Normal Operating Case with Reduced $CO_2$ in Feed |
|---|---|---|
| Vessel Diameter (mm) | 6000 | 6000 |
| Vessel Tan-Tan Length (mm) | 3006 | 3006 |
| Feed Temperature (° C.) | 18.3 | 18.3 |
| Feed Pressure (MPa) | 0.6 | 0.6 |
| Feed $CO_2$ (ppm) | 1000 | 400 |
| Feed Water (ppm) | 3602 | 3602 |
| Total Feed Flow Rate (kmol/hr) | 5928 | 5928 |
| On-Stream Time (hr) | 3.07 | 5 |
| Regeneration Time (hr) | 2.57 | 4.5 |
| Mass of alumina (kg) | 26958 | 26958 |
| Mass of 13X (kg) | 22869 | 22869 |
| Regeneration Temperature (° C.) | 200 | 200 |
| Required Regeneration Flow Rate (kmol/hr) | 1121 | 735 |
| Pressure Drop on Feed Step (kPa) | 14.6 | 14.6 |
| Pressure Drop on Regeneration Step (kPa) | 12.3 | 6.17 |
| Compression Power Required to Overcome Pressure Drops (kW) | 321 | 229 |

As can be seen from the above data, the present invention provides a power saving of 92 kW

TABLE 2

TSA Cycle

|  | Design Case | Normal Operating Case with Reduced $CO_2$ in Feed |
|---|---|---|
| Vessel Diameter (mm) | 2438 | 2438 |
| Vessel Tan-Tan Length (mm) | 2527 | 2527 |
| Feed Temperature (° C.) | 35 | 35 |
| Feed Pressure (MPa) | 0.9 | 0.9 |
| Feed $CO_2$ (ppm) | 600 | 400 |
| Feed Water (ppm) | 6433 | 6433 |
| Total Feed Flow Rate (kmol/hr) | 743 | 743 |
| On-Stream Time (hr) | 3.94 | 5 |
| Regeneration Time (hr) | 3.44 | 4.5 |
| Mass of alumina (kg) | 2869 | 2869 |
| Mass of 13X (kg) | 3703 | 3703 |
| Regeneration Temperature (° C.) | 200 | 200 |
| Required Regeneration Flow Rate (kmol/hr) | 200 | 169 |
| Pressure Drop on Feed Step (kPa) | 7.93 | 7.93 |
| Pressure Drop on Regeneration Step (kPa) | 18.1 | 15.8 |
| Compression Power Required to Overcome Pressure Drops (kW) | 59 | 53 |

As can be seen from the above data, the present invention provides a power saving of 6 kW While the invention has been described in detail and with reference to specific examples thereof, it will be apparent to one skilled in the art that various changes and modifications can be made therein without departing from the spirit and scope thereof.

The invention claimed is:

1. A cyclical swing adsorption process in which one adsorber bed is in an on-stream mode, during which adsorbate is adsorbed from a feed gas mixture passing through the bed, while another adsorber bed is in a regeneration mode, during which the adsorbed adsorbate is desorbed from the bed, and said beds alternate between said modes, wherein the time required to complete the on-stream mode is determined by the total amount of the adsorbate in the feed gas mixture fed to the bed during said mode, the concentration of the adsorbate in the feed gas mixture is monitored during said on-stream mode and the time required to complete the on-stream mode predicted from said monitored concentration, and at least one regeneration mode operating condition is modified in response to changes in said predicted time whereby the regeneration mode is completed at the same time as the concurrent on-stream mode.

2. The process according to claim 1, wherein there is a minimum time for completion of the on-stream mode based on a datum concentration of the adsorbate in the feed gas mixture and the predicted time for completion changes only when the monitored concentration exceeds said datum concentration to the extent that the predicted time exceeds said minimum time.

3. The process according to claim 1, wherein the adsorbate is carbon dioxide.

4. The process according to claim 2, wherein the adsorbate is carbon dioxide and said datum concentration is about 400 ppm.

5. The process according to claim 3, wherein the feed gas mixture is air, the said adsorbate is carbon dioxide and water is additionally adsorbed during the on-stream mode.

6. The process according to claim 1, wherein the concentration of the adsorbate is monitored by measurement in the feed gas mixture upstream of the on-stream adsorber bed.

7. The process according to claim 1, wherein the concentration of the adsorbate is monitored by measurement in the on-stream adsorber bed.

8. The process according to claim 1, wherein the at least one regeneration mode operating condition comprises the flow rate of purge gas through the adsorber bed in the regeneration mode.

9. The process according to claim 1, wherein the at least one regeneration mode operating condition comprises the heat of purge gas fed to the adsorber bed in the regeneration mode.

10. The process according to claim 1, wherein the process is a cyclical thermal swing adsorption process.

11. The process according to claim 1, wherein there are two or more adsorbates in the feed gas mixture, the time required to complete the on-stream mode is determined by the total amount of two or more of the adsorbates in the feed gas mixture fed to the bed during said mode, the concentrations of said adsorbates in the feed gas mixture determining the said on-stream time are monitored during said on-stream mode and the time required to complete the on-stream mode predicted from said monitored concentrations, and at least one regeneration mode operating condition is modified in response to changes in said predicted time whereby the regeneration mode is completed at the same time as the concurrent on-stream mode.

12. An air separation process in which air is compressed in a main air compressor to provide compressed air; carbon dioxide is removed from the compressed air by a cyclical swing adsorption process in which one adsorber bed is in an on-stream mode, during which carbon dioxide is adsorbed from the compressed air to provide a carbon dioxide-freed air feed, while another adsorber bed is in a regeneration mode, during which the carbon dioxide is desorbed from the bed, and said beds alternate between said modes; and the carbon dioxide-freed air feed is fed to an air separation unit to provide at least one product stream enriched in a component of the carbon dioxide-freed air feed, wherein the time required to complete the on-stream mode is determined by the total amount of the carbon dioxide in the compressed air, the concentration of the carbon dioxide in the compressed air is monitored during said on-stream mode and the time required to complete the on-stream mode predicted from said monitored concentration, and at least one regeneration mode operating condition is modified in response to changes in said predicted time whereby the regeneration mode is completed at the same time as the concurrent on-stream mode.

13. The air separation process according to claim 12, wherein the concentration of the adsorbate is monitored by measurement in the feed gas mixture upstream of the on-stream adsorber bed.

14. A cyclical swing adsorption apparatus for conducting a process as claimed in claim 1, said apparatus comprising:
   at least two adsorber beds;
   a control circuit for maintaining one bed in an on-stream mode for a time determined by total amount of adsorbate in the feed gas mixture fed to the bed during said mode, during which on-stream mode adsorbate can be adsorbed from a feed gas mixture passing through the bed, and another bed in a regeneration mode, during which the adsorbed adsorbate can be desorbed from the bed, and alternating said beds between said modes; and
   a total adsorber sensor for measuring the total amount of the adsorbate in the feed gas mixture fed to the bed during the on-stream mode, thereby determining the duration of the on-stream mode;
   a concentration monitor for monitoring the concentration of the adsorbate in the feed gas mixture during said on-stream mode; and
   a processor for predicting, from said monitored concentration, the time required to complete the on-stream mode, said control circuit modifying at least one regeneration mode operating condition in response to changes in said predicted time whereby the regeneration mode is completed at the same time as the concurrent on-stream mode.

15. A cyclical swing adsorption apparatus for conducting a process as claimed in claim 14, wherein said total adsorber sensor is common with said concentration monitor.

16. The cyclical swing adsorption apparatus according to claim 14, wherein the concentration monitor measures the concentration of the adsorbent in the feed gas mixture upstream of the on-stream adsorber bed.

17. The cyclical swing adsorption apparatus according to claim 14, wherein the concentration monitor measures the concentration of the adsorbent in the on-stream adsorber bed.

18. The cyclical swing adsorption apparatus according to claim 14, wherein the control circuit controls the flow rate of purge gas through the adsorber bed in the regeneration mode.

19. The cyclical swing adsorption apparatus according to claim 14, wherein control circuit controls the heat of purge gas fed to the adsorber bed in the regeneration mode.

20. The cyclical swing adsorption apparatus according to claim 14, wherein the apparatus is a cyclical thermal swing adsorption.

21. An air separation system for conducting a process as claimed in claim 12 comprising:
   a main air compressor to provide compressed air;
   a cyclical swing adsorption apparatus to provide a carbon dioxide-freed air feed, and
   an air separation unit for separating said carbon dioxide-freed air feed to provide at least one product stream enriched in a component thereof, said cyclical swing adsorption apparatus comprising:

at least two adsorber beds;

a control circuit for maintaining one bed in an on-stream mode for a time determined by total amount of adsorbate in the feed gas mixture fed to the bed during said mode, during which on-stream mode adsorbate can be adsorbed from a feed gas mixture passing through the bed, and another bed in a regeneration mode, during which the adsorbed adsorbate can be desorbed from the bed, and alternating said beds between said modes; and a total adsorber sensor for measuring the total amount of the adsorbate in the feed gas mixture fed to the bed during the on-stream mode, thereby determining the duration of the on-stream mode;

a concentration monitor for monitoring the concentration of the adsorbate in the feed gas mixture during said on-stream mode; and a processor for predicting, from said monitored concentration, the time required to complete the on-stream mode, said control circuit modifying at least one regeneration mode operating condition in response to changes in said predicted time whereby the regeneration mode is completed at the same time as the concurrent on-stream mode.

* * * * *